United States Patent [19]

Naumanen

[11] Patent Number: 5,059,080
[45] Date of Patent: Oct. 22, 1991

[54] APPARATUS FOR STORING AND CONVEYING ROLLER PALLETS OR EQUIVALENT

[76] Inventor: Esko Naumanen, Karhunkatu 19, SF-05460 Hyvinkaa, Finland

[21] Appl. No.: 358,397

[22] Filed: May 26, 1989

[30] Foreign Application Priority Data

Jun. 1, 1988 [FI] Finland .................................. 882589

[51] Int. Cl.$^5$ ................................................ B65G 1/06
[52] U.S. Cl. .................................... 414/276; 414/280; 414/286; 104/163
[58] Field of Search ............... 414/276, 277, 278, 280, 414/286; 104/163, 169, 306

[56] References Cited

U.S. PATENT DOCUMENTS

| | | | |
|---|---|---|---|
| 1,499,778 | 7/1924 | Loughridge | 104/163 X |
| 3,434,604 | 3/1969 | Haldimann et al. | 414/286 X |
| 3,837,511 | 9/1974 | Howlett | 414/286 X |
| 3,895,724 | 7/1975 | Thompson et al. | 414/276 |
| 3,982,639 | 9/1976 | Haldimann et al. | 414/286 X |
| 4,200,421 | 4/1980 | Haldimann | 414/280 |
| 4,467,725 | 8/1984 | Haldimann | 414/280 X |
| 4,673,326 | 6/1987 | Halonen et al. | 414/286 |
| 4,715,765 | 12/1987 | Agnoff | 414/276 |
| 4,759,677 | 7/1988 | Hammond | 414/276 |
| 4,915,566 | 4/1990 | van Elton | 414/286 X |

FOREIGN PATENT DOCUMENTS 1442471 12/1988 U.S.S.R. ............................. 414/280

Primary Examiner—David A. Bucci
Assistant Examiner—James Keenan
Attorney, Agent, or Firm—Kenyon & Kenyon

[57] ABSTRACT

A method and apparatus for the disposition of loads movable on wheels, e.g. roller pallets or their equivalent, in a storage area consisting of one or more storage levels located one above the other and provided with collateral flow-through channels for the loads, the storage levels being arranged either horizontally or with a slight downward inclination towards the output end, provides that each storage channel has a conveyor rail mechanism which, by utilization of a conveyor rail, both guides and conveys the loads of goods in the channel.

16 Claims, 10 Drawing Sheets

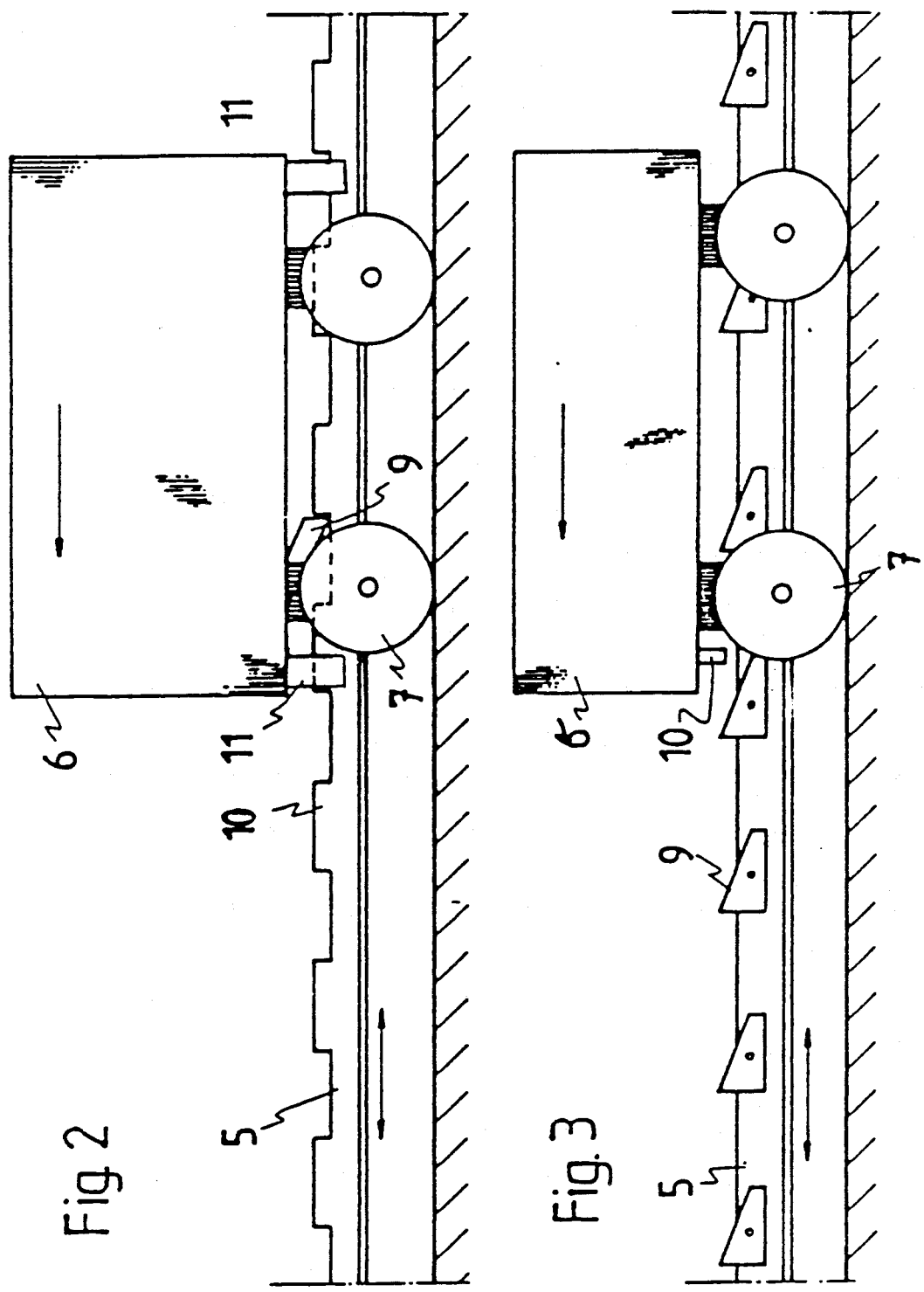

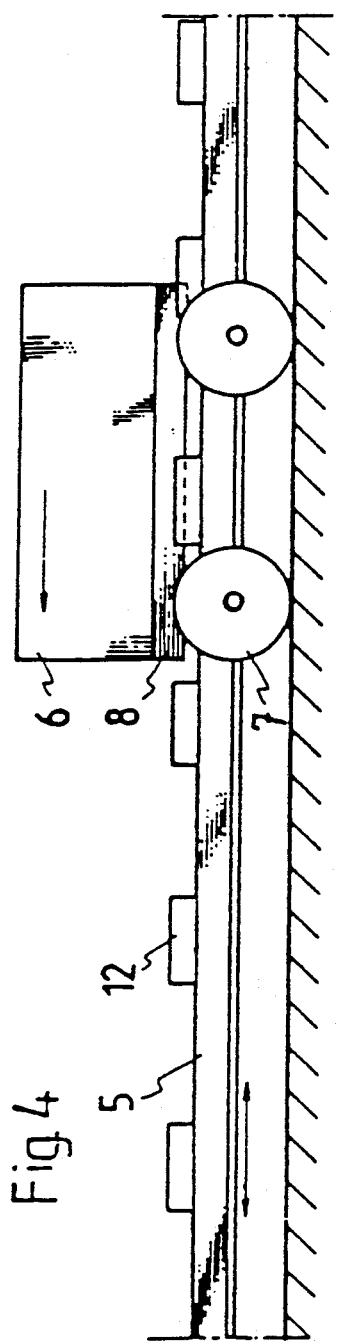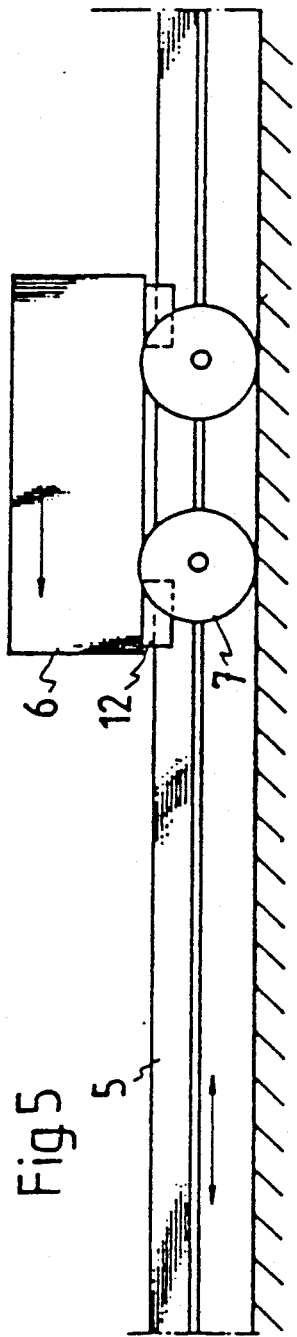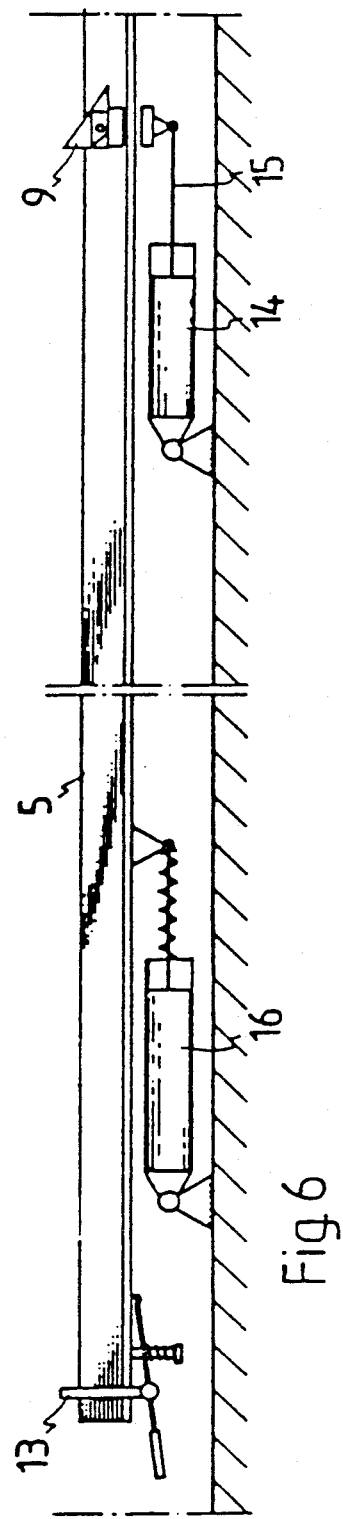

APPARATUS FOR STORING AND CONVEYING ROLLER PALLETS OR EQUIVALENT

BACKGROUND OF THE INVENTION

1. Field of the Invention

The present invention relates to a method and apparatus for the disposition of loads movable on wheels, e.g. roller pallets or their equivalent, in a storage area consisting of one or more storage levels located one above the other and provided with collateral flow channels for the loads, said storage levels being arranged either horizontally or with a slight downward inclination towards their output ends. Such disposition may be, for example, storage or conveyance.

Such a storage system is particularly suited for a plant whose output consists of products for daily consumption. The system provides a buffer store for production and allows easy preparation and formation of shipments during the loading of transport vehicles.

2. Description of Related Art

There are some applications used for the storage of loads movable on wheels which employ flow-through channels provided with a transport track, at least one of the rails of which is a guiding rail, and with a mechanism for moving the loads of goods towards the output end of the channel. (Hereinafter, the term "load" or "load of goods" refers to any kind of load movable on wheels, e.g. pallets provided with wheels of their own, loads with rollers under them, roller cages and loaded platforms or containers provided with wheels.)

SUMMARY OF THE INVENTION

An object of the present invention is a method and apparatus for the storage and conveying of loads of goods which provides considerable improvements in comparison to existing systems. According to the invention, each storage channel is provided with a conveyor rail mechanism which, by means of a conveyor rail, both guides and conveys the loads of goods in the channel.

In a preferred embodiment of the method of the invention the force moving the load of goods may be transmitted from the conveyor rail mechanism to the load by means of friction.

In another preferred embodiment of the method of the invention the force moving the load of goods may be transmitted from the conveyor rail mechanism to the load via thrust surfaces between the conveyor rail and the load.

In a preferred embodiment of the apparatus of the invention, the guiding function may be implemented using roller and/or sliding guides attached to the bottom of the load, in which case the conveyor rail has a smooth guiding surface, or to the conveyor rail itself, in which case the bottom of the load is provided with a continuous guide bar of a length essentially equal to that of the load.

In another preferred embodiment of the apparatus of the invention, the load may be moved by virtue of the friction between the load and the conveyor rail, in which case the element transmitting the conveying force is a gripping device employing e.g. a wedge, a slide, an eccenter, a roller, a force couple of a similar element based on the use of friction.

The invention provides several advantages over earlier techniques. The storage system employing conveyor rails considerably reduces the need for manual handling of the goods, because the products are already in the storage or shipment area. Since each product or shipment is placed in its own channel, finding the right products is easy. Also, the system helps maintain good order, because the locations of the trains of loads are determined by the conveyor rail and the loads can be extracted in the same order in which they were brought in. As the system obviates the need for transport rails and their supports, keeping the storage area clean is easier than with prior art systems. The system enables considerable economies to be achieved, because, as stated before, it need not be provided with transport rails and rail supports, and because the installation work required is substantially reduced.

BRIEF DESCRIPTION OF THE DRAWINGS

In the following, the invention is described by the aid of examples of preferred embodiments, reference being made to the drawings attached, wherein;

FIGS. 2 and 3 are diagrammatic side views of a conveyor rail employing thrust surfaces, with a load on the rail;

FIGS. 4 and 5 are diagrammatic side views of a conveyor rail based on the use of friction, with a load on the rail;

FIG. 6 illustrates the principle of operation of the conveyor rail, which moves back and forth.

DESCRIPTION OF PREFERRED EMBODIMENTS

Figure 1A:
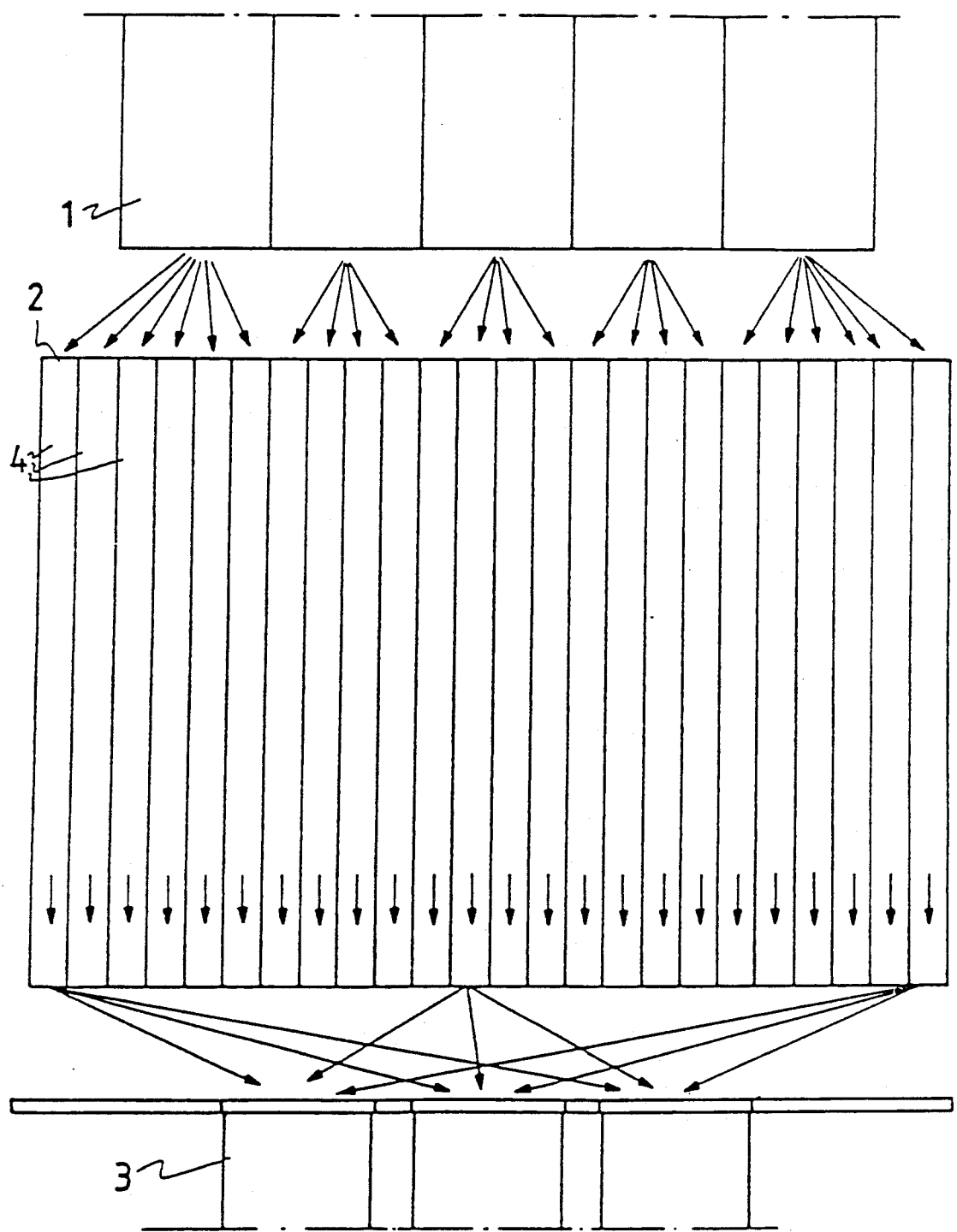
FIGS. 1a and 1b are diagrams representing the storage and conveying system as a whole.
Figure 1B:
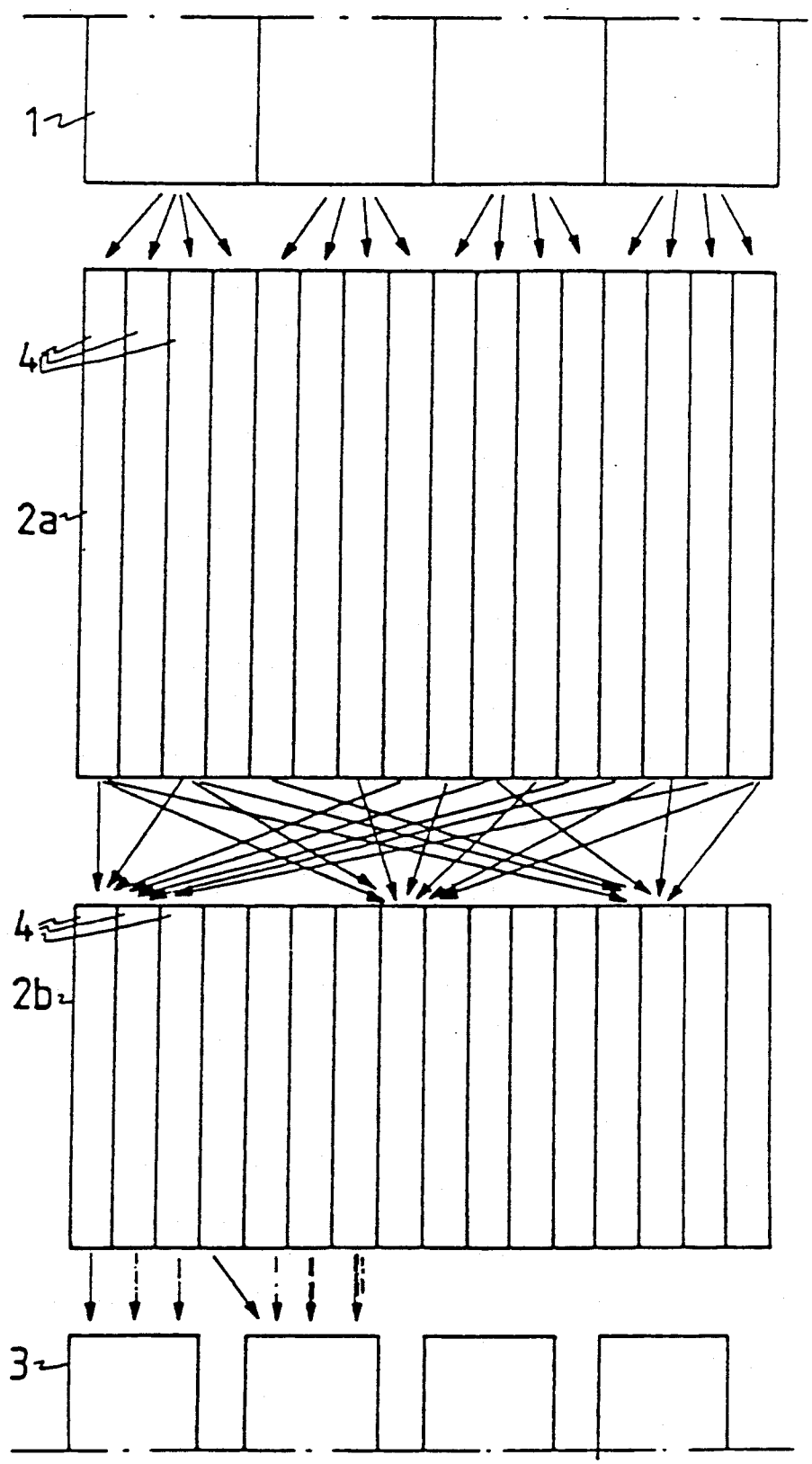

FIGS. 1a and 1b show two different variants of the storage and conveying system in a diagrammatic form. The system in FIG. 1a consists of three main sections, which are: the production lines 1, a common buffer (storage) area 2 for finished products and deliveries, and a loading zone 3 for transport vehicles. In the case of FIG. 1b, the buffer area for finished products and deliveries has been divided into two sections 2a and 2b, of which section 2a is a storage area and section 2b an area for preparation and deliveries. The goods are taken from one section to the next either manually or by means of a transfer carriage or stacker. The arrows in FIGS. 1a and 1b represent the flow of the goods. The storage area 2, 2a, 2b may consist of one or more levels, either horizontal or slightly inclined towards the output end, placed one above the other and provided with collateral flow-through channels 4.

Referring to FIG. 2, each channel 4 is provided with a conveyor rail 5 which both conveys and guides the loads 6 towards the output end of the channel. Since the conveyor rail mechanism both moves and guides the loads 6, the storage channels on each level need not be provided with transport rails and their supports. Instead, the loads 6 move on their own wheels 7 as conveyed and guided by the conveyor rail 5.

The guiding function may be implemented using either roller guides or sliding guides or both. The guides may be placed either on the underside of the load 6, in which case the conveyor rail 5 moving back and forth and whose length is substantially equal to that of the channel has a smooth guiding surface (FIGS. 3 and 5), or on the conveyor rail 5 itself, in which case the load bottom is provided with a continuous guide bar 8 of a length essentially equal to that of the load (FIG. 4).

The force required to move the load is transmitted either by friction or via thrust surfaces. In the latter case, the moving element 9 is e.g. a cog or a pawl (FIGS. 2 and 3). The moving element 9 may be placed either on the bottom of the load 6 (FIG. 2) or on the conveyor rail 5 moving back and forth (FIG. 3), and the thrust surface correspondingly either on the conveyor rail (FIG. 2) or on the bottom of the load 6 (FIG. 3). The guiding and moving functions may be performed either by the same means or by separate means. For example, in the embodiment shown in FIG. 2, these two functions are separated, with guiding elements 11 being used to guide the load and moving elements 9 to move it along.

FIGS. 4 and 5 show examples of ways of moving and guiding the load by means of friction. In FIG. 4, the bottom of the load is provided with a guide bar 8 as mentioned before, and the conveyor rail 5 is correspondingly provided with a gripping and guiding element 12, in which case the conveyor rail 5 moves the load by virtue of the friction between the guide bar 8 and the gripping and guiding element 12. FIG. 5 represents an embodiment in which the gripping and guiding elements 12 are attached to the bottom of the load 6 and the conveyor rail 5 has a smooth surface, as stated above.

As shown by the arrows in FIGS. 2–5, the load 6 is moved in one direction only while the conveyor rail 5 moves back and forth. Therefore, the moving element 9 must grip when the rail 5 moves in one direction and release when the rail moves in the other direction. In the case of cogs as moving elements, this grip/release action is achieved by using turnable cogs. In a friction-based system, the same is achieved by the use of various types of friction arrester. These will be described below.

The diagram in FIG. 6 illustrates the principle of the conveyor rail system of the invention. The load (a roller pallet, not shown in FIG. 6) may be taken, for example, manually from the end of the production line (from the right in FIG. 6) to the channel reserved for the product in question. If necessary, this stage of operation can employ an automatic transfer carriage or distributing conveyor or a stacker or equivalent means. A separate rail (not shown) fixed to the floor guides the load to the conveyor rail as the operator takes the load for example by pushing it, to be in place on the conveyor rail. A feeder, for example a pneumatic feeder activated by an operator pressing a manual valve, may be used to push the load forward along the conveyor rail 5 a distance equal to the load length, thereby also pushing the train of pallets in front of it. After performing its working motion, the feeder returns to a rearward position. By means of this feeder mechanism, the channel can be filled. The channel may be provided with an end buffer stop 13 to prevent overfilling and to damp the impact of the load against the end. The feeder may comprise an actuating cylinder 14, e.g. a pneumatic cylinder, whose piston moves the moving element 9 relative to the conveyor rail during the working stroke. The moving element in turn moves the load. The moving element is mounted on a slide on the conveyor rail. After the working motion, the piston 15 returns, naturally without moving the load. Of course, the cylinder can be replaced by some other type of actuator. For example, it is possible to use a device which converts rotary motion into reciprocating motion.

To extract a load from the channel, the operator may depress the spring-return end stopper 13 and, for example by manual means either by hand or by foot, give a starting impulse to the actuator, e.g. a cylinder 16, which moves the conveyor rail longitudinally to and fro. The cylinder then performs a working motion, moving the conveyor rail 5 and thus causing the whole train of loads to move on while the operator takes the load at the end of the channel onto a vehicle, the rest of the train remaining behind the end stopper. Upon finishing its working motion, the cylinder 16 may automatically return to its rearward position. A guide rail (not shown) fixed to the floor helps the operator keep the load straight when taking it from the channel. If the channel is not full before the first pallet is taken out, the operator actuates the conveyor rail until the first pallet is brought to the end of the channel. When the automatic equipment is used to extract loads from the storage channels, the actuating impulse may be given by the load transfer device of the carriage or the stacker, or the load transfer device may be used as the actuator of the conveyor rail. In the manner described above, the supply of loads into the channel and the extraction of loads from it may proceed independently, i.e. without disturbing each other.

Figure 7:
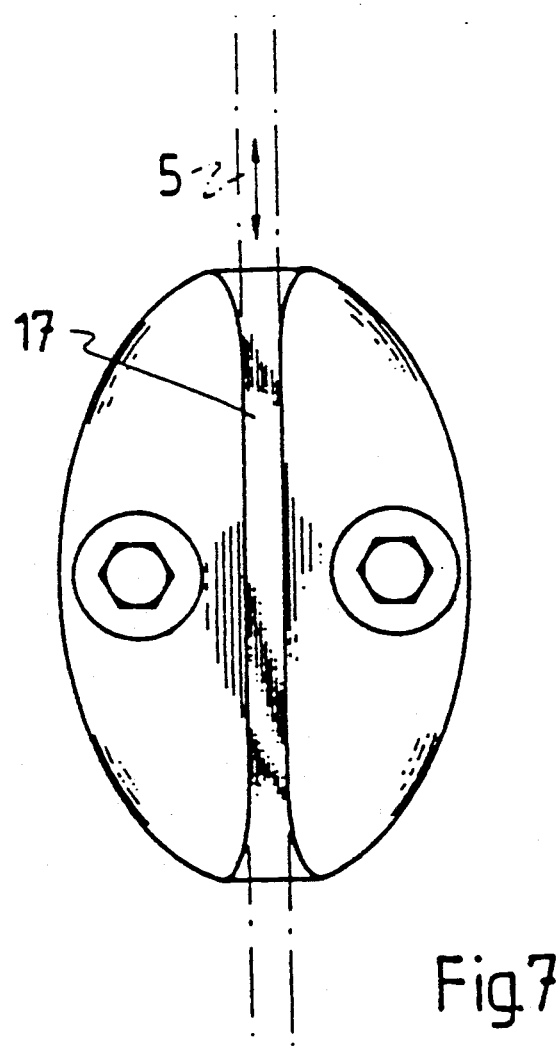
FIGS. 7 to 13 show embodiments of guides and gripping means, designed to be attached to the bottom of the load.
Figure 8:
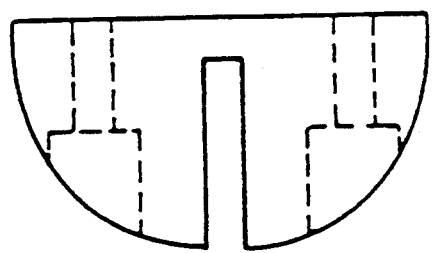

FIGS. 7 and 8 show an ordinary sliding guide, respectively seen from below and from either end, designed to be attached to the underside of the load. The guide has a groove 17 which fits the conveyor rail 5. When this type of sliding guide is used, separate load-moving elements 9 and thrust surfaces 10 are required.

Figure 9:
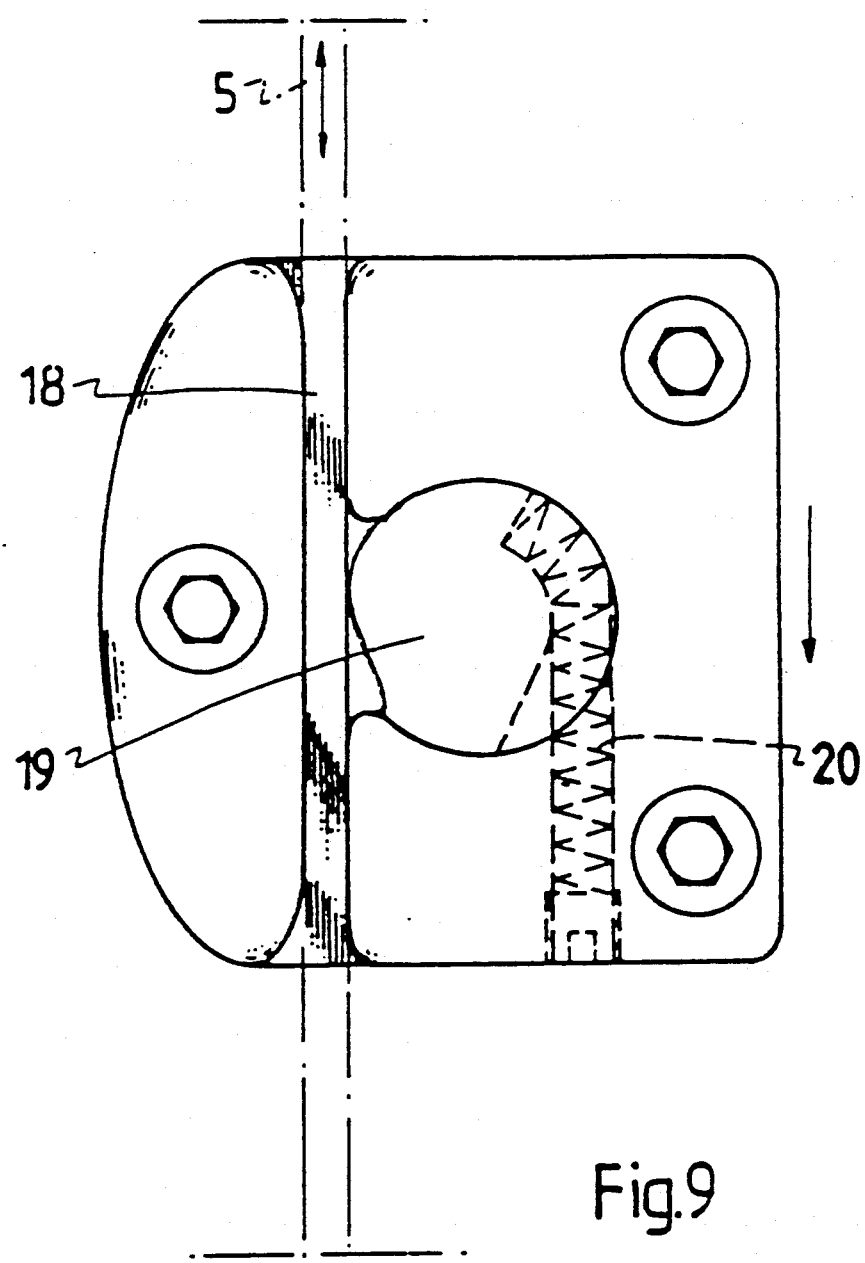
Figure 10:
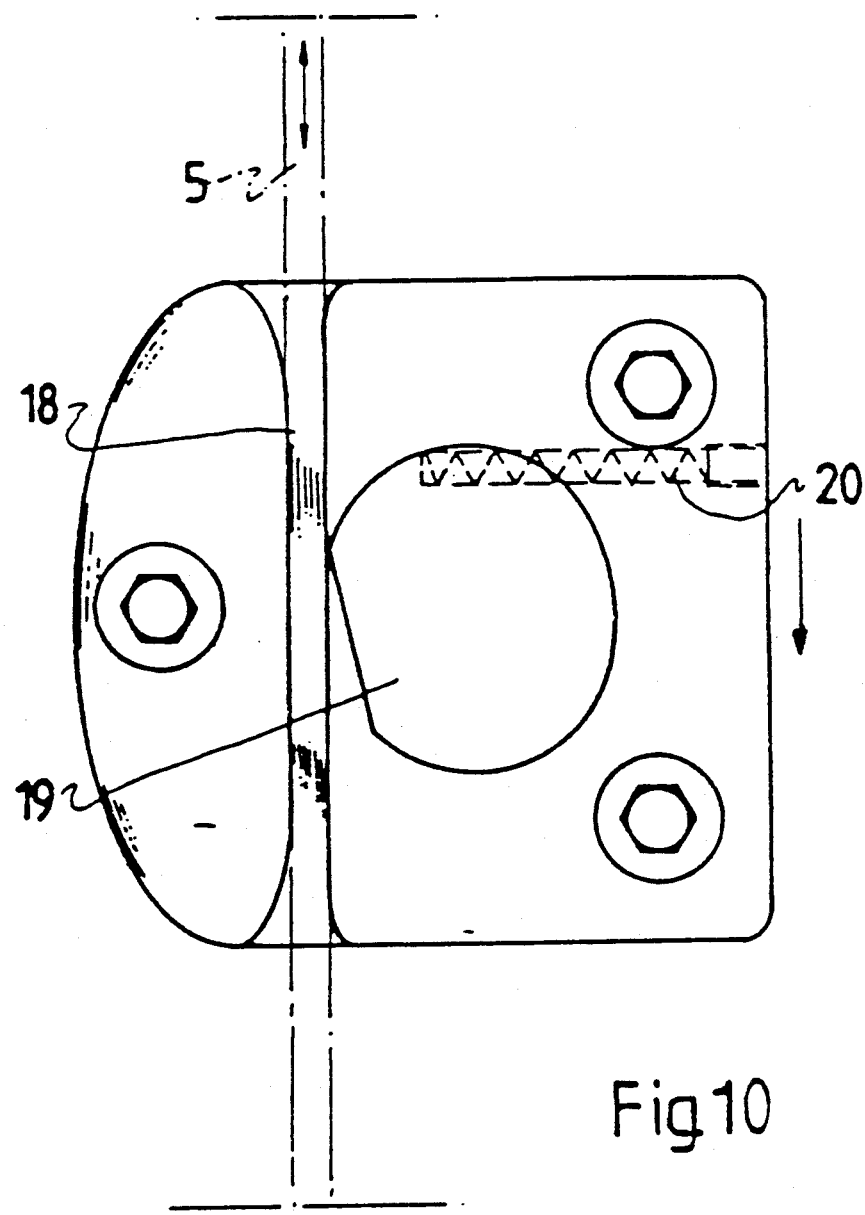

FIGS. 9–13 show different types of friction-based eccentric arresters designed to be used especially with the embodiment illustrated by FIG. 5. These arresters are also attached to the underside of the load. FIGS. 9 and 10 show two different eccentric arresters, with a groove 18 for the conveyor rail 5. In the centre of the arrester is an arresting element 19 which, at the side facing the conveyor rail 5, is either of an eccentric (FIG. 9) or a straight (FIG. 10) form. The arresting element is loaded by a spring 20. The eccentric or straight arresting surface allows the conveyor rail to slide in one direction only.

Figure 11:
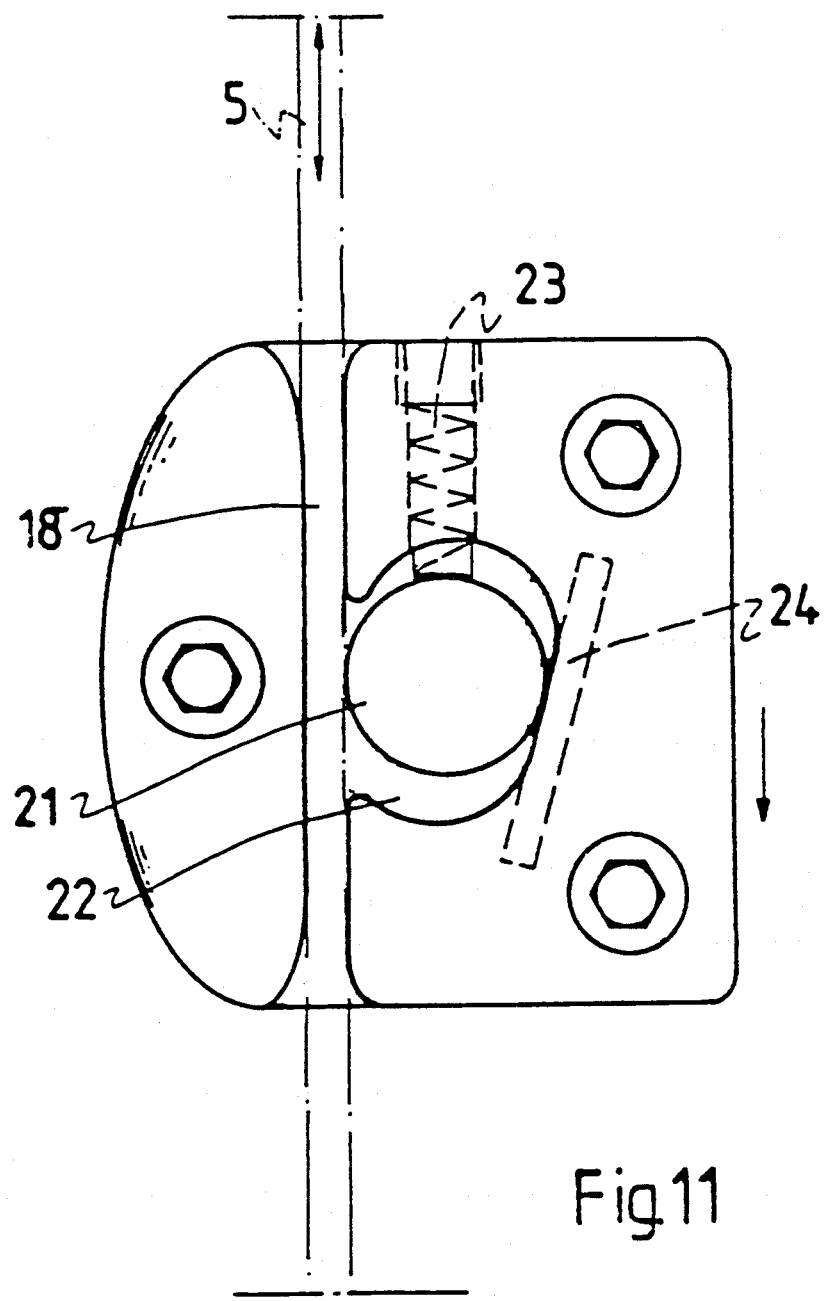

FIG. 11 shows a roller arrester, which is also attached to the bottom of the load and provided with a groove 18 for the conveyor rail 5. In the center of the arrester is a roller 21 placed in a slot 22 slightly askew relative to the groove 18. The roller is loaded by a spring 23 which acts in the direction of the conveyor rail 5 and the groove 18. On the side of the slot 22 which is away from the groove 18 there is a supporting element 24. With this arrangement, the conveyor rail is able to slide in one direction only (upward direction in FIG. 11) relative to the arrester.

Figure 12:
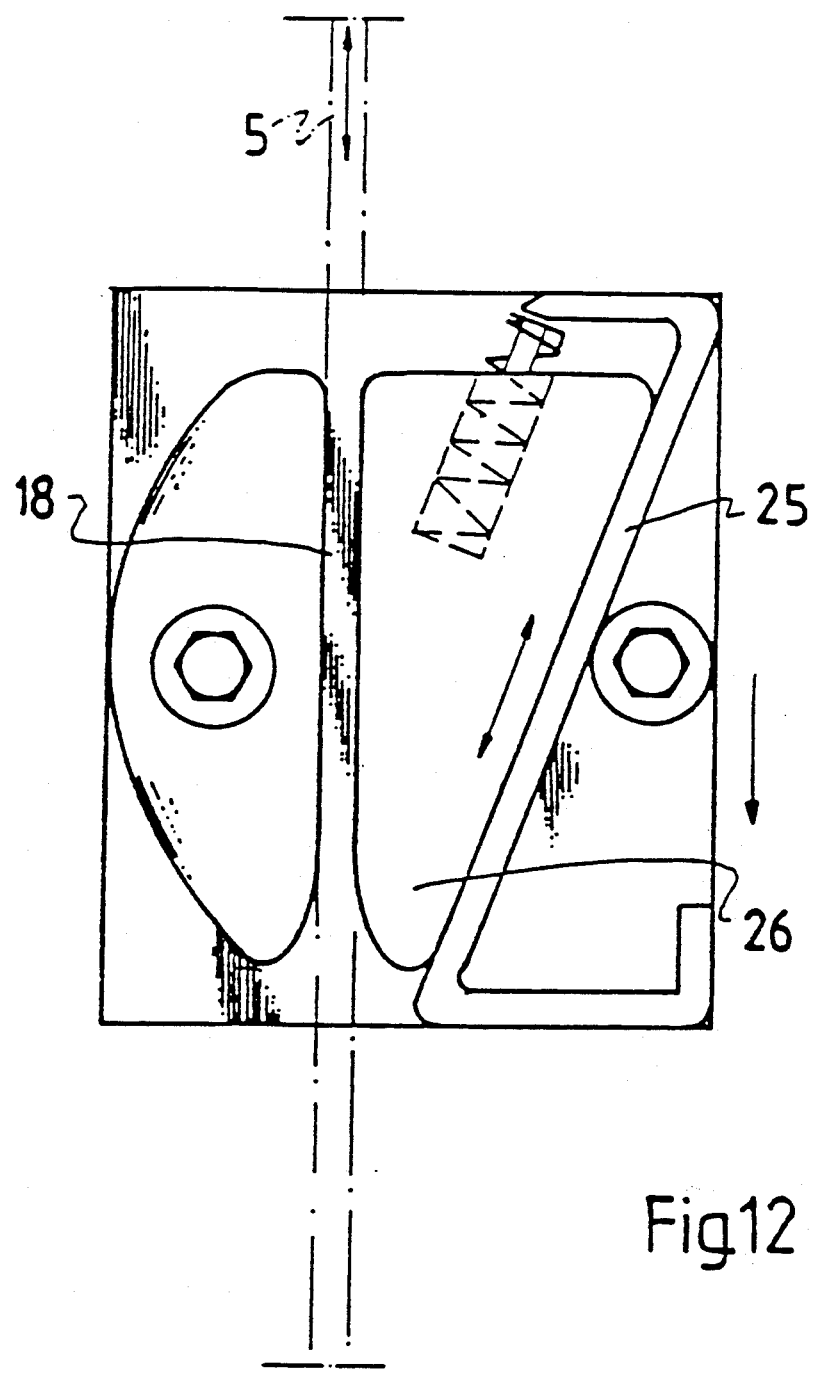

FIG. 12 shows a spring-loaded wedge arrester for attachment to the bottom of the load. The wedge 26 moves along a thrust surface 25. This arrangement, too, permits the conveyor rail 5 to slide in the upward direction (in FIG. 12) only.

Figure 13:
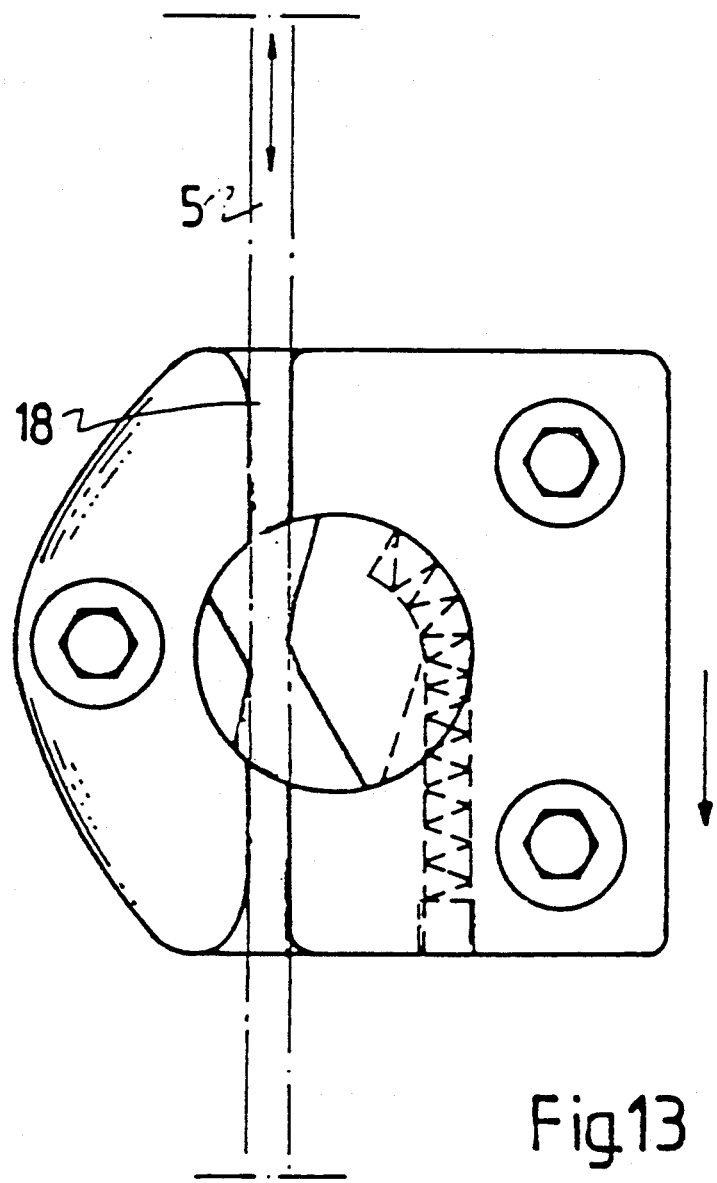

FIG. 13 shows an arrester employing a force couple. This arrester, too, is attached to the bottom of the load and permits the conveyor rail to move in only one direction in the groove 18, i.e. upwards in FIG. 13.

It is obvious to a person skilled in the art that the invention is not restricted to the examples of its embodiments discussed above, but that it may instead be varied in the scope of the following claims. Thus, in addition to the storage application described, the principle of conveying loads by means of a rail moving to and fro can be applied e.g. to conveyors and similar devices.

I claim:

1. An apparatus for the disposition of at least one load which is movable on wheels in a storage area, said storage area comprising at least one storage level provided with at least one collateral flow-through storage channel for said at least one load, said at least one storage level being arranged either horizontally or with a slight downward inclination towards its output end and said at least one storage channel being provided with a conveyor rail mechanism, said conveyor rail mechanism including a reciprocating conveyor rail, to both laterally guide and longitudinally convey at least one load in said at least one channel in cooperation with at least one load guiding and conveying means coupled to the bottom of said at least one load, wherein said at least one load guiding and conveying means receives said conveyor rail and includes surfaces on opposite sides of said conveyor rail to transmit a load conveying force from said reciprocating conveyor rail to said at least one load in one direction and to permit the reciprocating conveyor rail to move relative thereto in the other direction.

2. An apparatus according to claim 1, wherein said at least one load guiding and conveying means is selected from the group including roller guides, sliding guides, and a combination of roller guides and sliding guides, located on the bottom of each of said at least one load and said conveyor rail having a smooth guiding surface for cooperating with said at least one load guiding and conveying means.

3. An apparatus according to claim 1 purposed to provide the load conveying force to said at least one load by means of friction between said at least one load and said conveyor rail, wherein said at least one load guiding and conveying means transmits said load conveying force and includes a device for gripping said conveyor rail.

4. An apparatus according to claim 3 wherein said gripping device comprises an element for gripping said conveyor rail based on the use of friction.

5. An apparatus according to claim 1 wherein said at least one load guiding and conveying means includes at least one thrust surface for transmitting a thrust between said conveyor rail and said at least one load.

6. An apparatus according to claim 1 wherein said conveyor rail mechanism is combined with a feeder mechanism located in said at least one storage channel, such that said apparatus allows said at least one load to be brought manually into said at least one channel.

7. An apparatus according to claim 1 wherein said conveyor rail mechanism is combined with a feeder mechanism located in a transfer means purposed to bring said at least one load into said at least one storage channel.

8. An apparatus according to claim 1 wherein said conveyor rail mechanism is combined with a feeder mechanism located in a conveyor means purposed to distribute said at least one load into said at least one storage channel.

9. An apparatus according to claim 6, wherein said feeder mechanism is purposed to fill said a least one storage channel by pushing incoming loads into said at least one storage channel one after the other, forming a train of loads which moves along said at least one storage channel as more loads are supplied.

10. An apparatus according to claim 7, wherein said feeder mechanism is purposed to fill said at least one storage channel by pushing incoming loads into said at least one storage channel one after the other, forming a train of loads which moves along said at least one storage channel as more loads are supplied.

11. An apparatus according to claim 8, wherein said feeder mechanism is purposed to fill said at least one storage channel by pushing incoming loads into said at least one storage channel one after the other, forming a train of loads which moves along said at least one storage channel as more loads are supplied.

12. An apparatus according to claim 1 wherein said conveyor rail mechanism is combined with a feeder mechanism located in said at least one storage channel, such that said apparatus allows said at least one load to be brought manually into said at least one channel and wherein said feeder mechanism comprises an actuator having a piston connected to an element purposed to transmit said load conveying force and which is movable relative to said conveyor rail.

13. An apparatus according to claim 1 wherein said conveyor rail mechanism is combined with a feeder mechanism located in a transfer means purposed to bring said at least one load into said at least one storage channel and wherein said feeder mechanism comprises an actuator having a piston connected to an element purposed to transmit said load conveying force and which is movable relative to said conveyor rail.

14. An apparatus according to claim 1 wherein said conveyor rail mechanism is combined with a feeder mechanism located in a conveyor means purposed to distribute said at least one load into said at least one storage channel and wherein said feeder mechanism comprises an actuator having a piston connected to an element purposed to transmit said load conveying force and which is movable relative to said conveyor rail.

15. An apparatus according to claim 1 wherein said conveyor rail mechanism is combined with a further mechanism for extracting said at least one load, said further mechanism comprising a stopper to stop said at least one load at the end of said at least one channel and an actuator having a piston connected to said conveyor rail and purposed for movement between engaging and disengaging positions.

16. An apparatus according to claim 1 wherein said at least one load guiding and conveying means is selected from the group including a friction-based eccentric arrester, a roller-type arrester, a wedge-type arrester, and a force-type arrester.

* * * * *

UNITED STATES PATENT AND TRADEMARK OFFICE
CERTIFICATE OF CORRECTION

PATENT NO. : 5,059,080

DATED : October 22, 1991

INVENTOR(S) : Esko Naumanen

It is certified that error appears in the above-identified patent and that said Letters Patent is hereby corrected as shown below:

```
In Column 5, line 16, change "...longitudinally convey
    at least. ." to read --...longitudinally convey
    said at least...--
```

Signed and Sealed this

Twenty-seventh Day of April, 1993

Attest:

MICHAEL K. KIRK

*Attesting Officer*     Acting Commissioner of Patents and Trademarks